Aug. 3, 1943.     P. W. SMITH     2,326,049
CODED CONTINUOUS INDUCTIVE TRAIN CONTROL SYSTEM
Filed Jan. 23, 1941     3 Sheets-Sheet 2
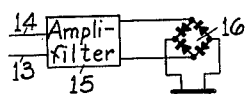
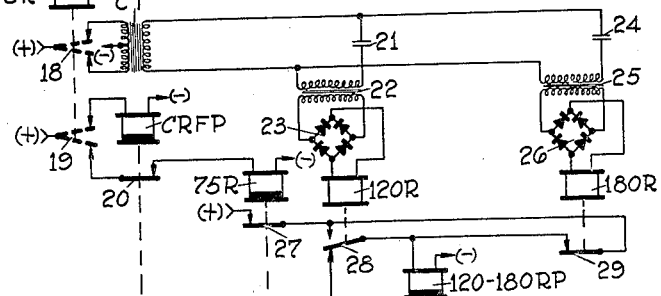
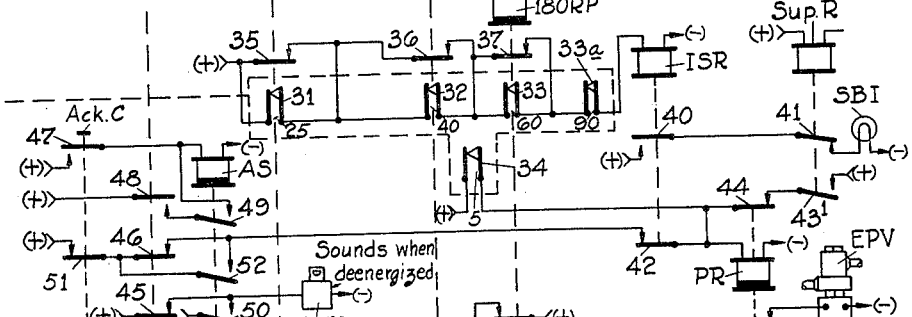
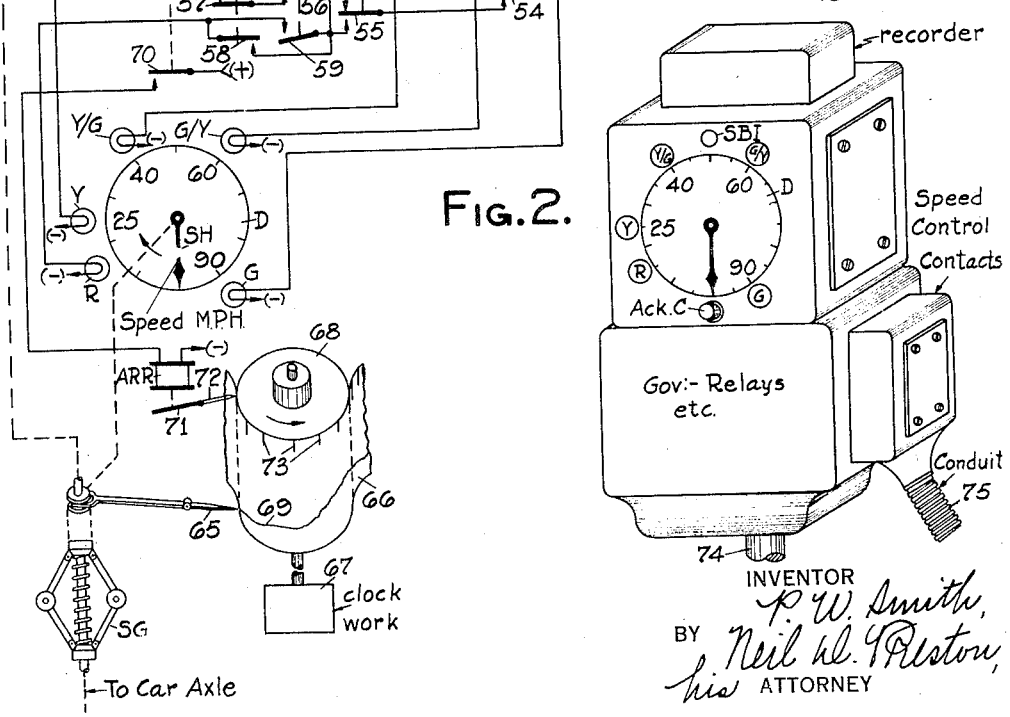
INVENTOR
P. W. Smith,
BY Neil W. Preston,
his ATTORNEY Aug. 3, 1943.    P. W. SMITH    2,326,049
CODED CONTINUOUS INDUCTIVE TRAIN CONTROL SYSTEM
Filed Jan. 23, 1941    3 Sheets-Sheet 3

INVENTOR
P. W. Smith
BY Neil W. Preston,
his ATTORNEY

Patented Aug. 3, 1943

2,326,049

UNITED STATES PATENT OFFICE 2,326,049

CODED CONTINUOUS INDUCTIVE TRAIN CONTROL SYSTEM

Percy W. Smith, New York, N. Y., assignor to General Railway Signal Company, Rochester, N. Y.

Application January 23, 1941, Serial No. 375,592

9 Claims. (Cl. 246—63)

This invention relates in general to coded continuous speed governed train control systems, and more particularly to a system in which the various parts are so arranged and associated as to give added information and safety over what is present in systems of this type.

In train control systems of the type involved in this application, and, in general, of the type disclosed in the patent granted to Reichard et al., No. 2,223,131, dated November 26, 1940, cab signals are displayed and varying speed restrictions corresponding thereto are set up in accordance with traffic conditions ahead. In such systems, it is necessary for the engineer to not only constantly watch the signals but to constantly interpret what the signal signifies as regards the permissible speed limit imposed in order to avoid penalties and possibly accidents.

In the present system, there is combined with the cab signals, a dial and pointer indicating the speed of the train in miles-per-hour. The contacts in the circuits setting up the permissible speeds are operated by a speed governor and the pointer indicating miles-per-hour is controlled by the same governor. Furthermore, the cab signals are positioned adjacent the dial and opposite the markings indicating the limiting speeds for which the signals stand, and adjacent the dial and the signals is an acknowledging button and a suppressive braking indicator whereby the engineer is constantly apprised of the speed limit under which he is operating by means of the signals and the visual interpretations of these signals.

The entire set of indications and controls and associated circuits are all combined in a compact convenient casing whereby to make for efficiency and economy. Also included in the casing is a recording tape with means for recording the speed of the train in miles-per-hour. This recorder is governed by the same speed governor that controls the speed contacts and the pointer. Also, the acknowledging button which is conveniently located adjacent the dial is arranged through circuit means to record on the train speed curve each acknowledging act at the time it occurs.

With such an arrangement of parts it can easily be appreciated that very simple additions can be made thereto to include with the train control system, a system known as a "loco-valve pilot" control means. This latter control means can, in many cases, be employed to advantage on locomotives in the interest of economy in steam consumption during the operation of the locomotive. It comprises a pointer passing over a dial, and indicating the speed of the engine in miles-per-hour, and a second pointer which indicates in miles-per-hour the point of steam valve cut-off (which, of course, is ordinarily expressed in percentage of piston travel). Also, the pilot control means ordinarily includes a tape, on which is recorded the speed of the vehicle and the position of steam valve cut-off, both expressed in terms of miles-per-hour. With the most efficient operation of the locomotive, the engineer controls the cut-off valve position so as to maintain the two pointers in registry, and after a run the record on the recording tape can be inspected and the efficiency of operation during the run can be readily determined.

With a train control system such as that referred to above, and which constitutes the subject matter of this invention, a valve pilot control can be included therewith by the mere addition thereto of a pilot control means for controlling a pointer which travels over the same dial as the speed dial of the train control system and indicates the position of steam valve cut-off in terms of miles-per-hour, and the addition of a recording means which records the steam valve cut-off position in terms of miles-per-hour on the same tape as is employed in the train control system. Thus, a train control system of the type here involved can be readily modified to include a "loco-valve pilot" control means, and at a very small expense.

Further objects, purposes, and characteristic features of the present invention will appear as the description progresses, reference being made to the accompanying drawings, showing solely for the purpose of illustration, and in no way whatsoever in a limiting sense, one form which the invention can assume. In the drawings:

Fig. 1 of drawings is constituted by the partial Figures 1A and 1B, showing schematically the trackway apparatus and car carried apparatus, respectively, of a train control system in accordance with the present invention.

Fig. 2 is a view of the system enclosed in its casing.

Figure 1A:
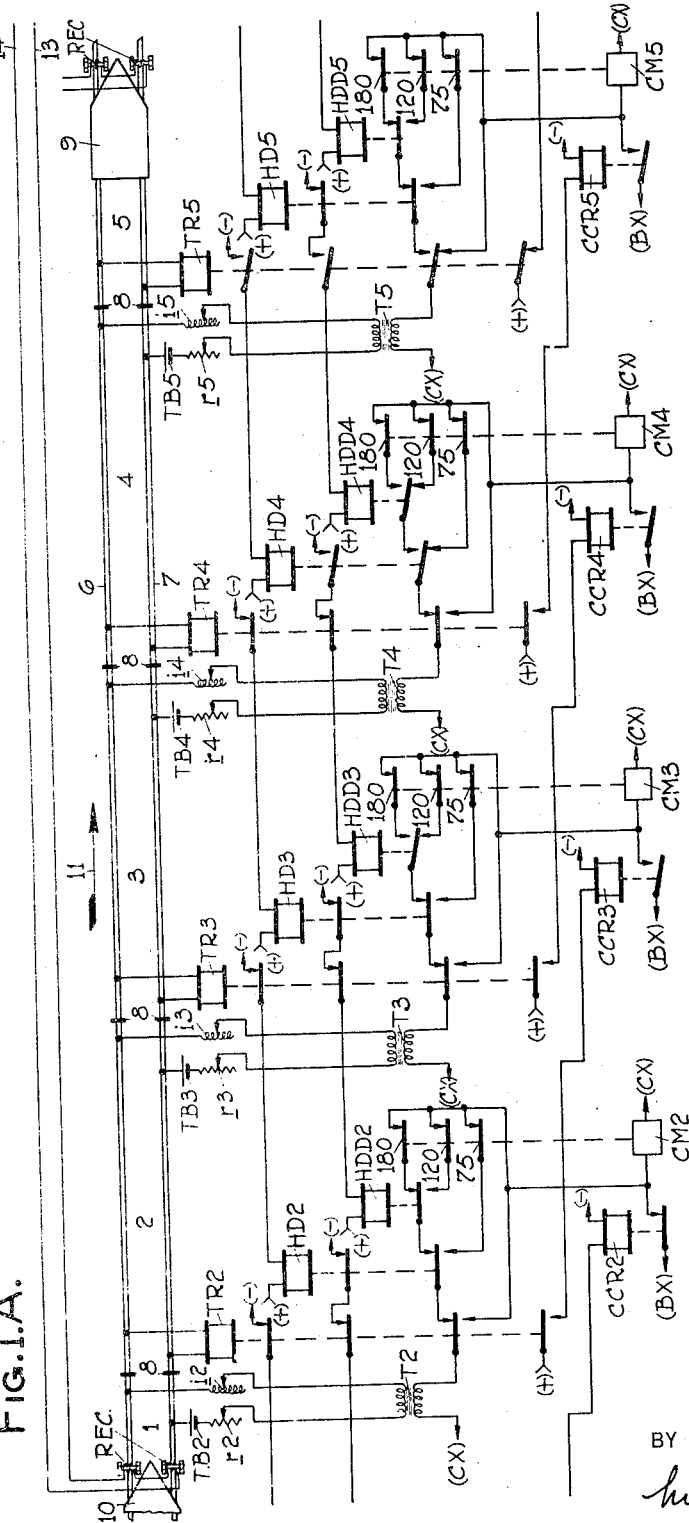

Referring now to these drawings, the trackway apparatus involved in the present invention comprises a stretch of single track constituted by track rails 6 and 7. The rails are separated into isolated sections in the usual manner by insulating joints 8, there being shown the several blocks 1, 2, 3, 4 and 5. Block 5 is occupied by a vehicle 9, while block 1 is occupied by a vehicle 10.

Since the apparatus of the trackway circuits is identical at the various locations, the same reference characters with distinctive suffix numbers are employed for the different parts at the various locations.

Considering the location where sections 2 and 3 meet, it can be seen that, with east bound traffic as indicated by the arrow 11, there is a track relay TR connected across the entrance end of each section and a track battery TB, connected across the exit end of each section. The track battery is connected across the rails in series with a usual adjustable resistance r. In series with the battery and resistance is the secondary of a track transformer T and an adjustable inductance i.

The primary winding of the track transformer is connected, through various contacts, so as to apply train control energy to the track rails. Dependent upon traffic conditions ahead this energy is either coded into separate current impulses applied at various rates or the energy which is alternating current preferably of a non-commercial frequency such as 100 cycles per second is steadily applied. If coded, the energy is chopped into separate impulses by means of a code motor CM controlled by a code control relay CCR which in turn is energized upon the entrance of a vehicle into a section due to the release of the track relay of the entered section, all as is obvious from the drawings.

The character of train control energy applied to the track rails is determined by traffic conditions ahead by means of the track relay TR of the location in question, a home distant relay HD at this location which is energized through a front point of the track relay of the section next in advance, and by a home distant-distant relay HDD which is controlled by front points in series of the track relay of the block next in advance and of the home distant relay of the block next in advance. Thus, at each location there is a track relay, a line relay which reflects conditions one block in advance, and a second line relay which reflects traffic conditions two blocks in advance.

It would appear that a detailed description of the trackway control means is unnecessary and likewise a tracing of the various circuits involved appears unnecessary since the control is obvious from the drawings considered in connection with the above description.

In brief, however, it can be said that, with the vehicle 9 occupying track section 5, the track relay of this section is deenergized to thereby deenergize both of the line relays of the section to the rear. Accordingly, in block 5 to the rear of the occupying vehicle, due to the wheels and axles of the vehicle shunting the track circuit, no train control energy is present in this block to the rear of the occupying vehicle. Block 4, immediately to the rear of the occupied block, is supplied with steadily applied alternating current. Block 3, to the rear thereof, is supplied with alternating current coded at the rate of 75 impulses per minute, block 2, next to the rear, with current coded at the rate of 120 impulses per minute, and block 1, to the rear thereof and all blocks to the rear thereof, with current coded at the rate of 180 impulses per minute.

Upon a vehicle, such as vehicle 10, entering a block, the coder is energized to place code across the rails at the exit end of the entered block, of the character determined by the traffic conditions ahead. This control energy is inductively received by receiver coils REC carried by the vehicle ahead of the foremost pair of wheels and axle, and after passing through wires 13 and 14, pass through an amplifilter 15 and a full-wave rectifier 16 to energize a code following relay CR. This relay operates its contacts 18 and 19 at the same rate as the rate of the code being received. Relay CR is therefore deenergized when the vehicle in question is in an occupied block, is steadily energized when in the block immediately to the rear thereof, and vibrates its contacts at the rates of 75, 120, and 180 times per minute when in the three blocks, respectively, next to the rear.

Energized through contact finger 19 and front point of relay CR is a slow release code following repeater relay CRFP, which remains attracted not only while relay CR is in attracted position but while relay CR is vibrating its contact finger 19 at any of the different code rates.

A relay 75R is energized through contact finger 19 and back point of relay CR, and contact finger 20 and front point of relay CRFP, and hence, relay 75R picks up and remains in attracted position so long as contact finger 19 is vibrating at any of the code rates. If this contact finger 19, however, remains in attracted, or in retracted, position for any great length of time, relay 75R releases.

Contact finger 18 of relay CR energizes one-half of the primary winding of code transformer CT when in attracted position with current flowing in one direction, and energizes the other half of the primary of this transformer when in its retracted position, with current flowing in the other direction, whereby to constitute a well known "push-pull" type of transformer to produce in the secondary of this transformer current impulses at the rate of the code then in force.

Connected across the secondary of transformer CT is a circuit tuned to substantial resonance at 120 impulses per minute. This circuit including a condenser 21 and the primary of a transformer 22, the secondary of which is connected to the input side of a full-wave rectifier 23, the output side of which is connected across the winding of a code relay 120R.

In like manner, a tuned circuit constituted by a condenser 24 and the primary of a transformer 25, is tuned to substantial resonance at 180 impulses per minute. The secondary of this transformer 25 is connected to the input side of a full-wave rectifier 26, the output side of which is connected across the winding of a code relay 180R.

Relays 120—180RP and 180RP are of the slow release type and these relays, as well as relay 75R, are supplied with a short-circuited low-resistance copper band, or the like, to impart the desired slow release characteristics to these relays.

As thus far described, it can be seen that, with control energy coded at the rate of 180 impulses per minute received on the vehicle, relays 75R, 180R and CRFP pick up and remain picked up. With energy coded at the rate of 120 impulses per minute being received, relay 180R releases and relay 120R picks up and remains up while 75R and CRFP remain up. With energy coded at the rate of 75 impulses per minute being received, both 120R and 180R release and stay down with 75R and CRFP up. With steadily applied control energy received on the vehicle, code relay CR picks up and remains up as likewise does repeater relay CRFP with the other relays 75R, 120R and 180R down. Upon no control energy being received relay CR releases and stays released and all of the other above mentioned relays, including relay CRFP, remain in released position.

Employed in this system is a repeater relay 120—180RP which repeats relay 180R and also relay 120R and is energized through circuits each including contact finger 27 and front point of relay 75R and one including contact finger 28 and front point of relay 120R, and the other contact finger 29 and front point of relay 180R.

There is also a repeater relay 180RP which repeats relay 180R and this relay is energized through a circuit including contact finger 27 and front point, contact finger 29 and front point of relay 180R, and contact finger 28 and back point of relay 120R.

A plurality of speed controlled contacts is employed in the system and as indicated, these contacts are controlled by a speed controlled governor SG of the centrifugal type, driven from the car axle, for example. The speed controlled contact 31 is arranged to open when the speed exceeds 25 miles per hour, contact 32 opens at a speed above 40 miles per hour, contact 33 opens at a speed above 60 miles per hour, contact 33a opens at a speed of 90 miles per hour, and contact 34 opens at a speed above 5 miles per hour.

The speed contacts 31, 32 and 33 are arranged in multiple with contact fingers 35, 36 and 37, respectively, of relays 75R, 120—180RP, and 180RP while high speed contact 33a is between an indication suppression relay ISR and contact 33. Thus, if a particular speed contact 31, 32 or 33 be open, it is necessary that the corresponding multiple relay contact be closed, or else the indication suppression relay ISR which is energized through the speed contacts in series and the relay contacts in series, with the two sets of series contacts arranged in multiple, becomes deenergized.

For example, if the speed of the vehicle be above 60 miles per hour, all of the speed contacts except 33a are open, and unless contact 37 of relay 180RP be closed, relay ISR releases. The other speed contacts and relay contacts operate in like manner, whereby, to prevent the release of the indication suppression relay ISR, the speed of the vehicle must be kept within certain limits depending upon traffic conditions ahead. If the code in force be the 180 code, the speed can exceed 60 miles per hour but, due to contact 33a, not 90 miles per hour. If, however, the code rate be 120, the limiting speed is 60 miles per hour. If the code rate be 75, the limiting speed is 40 miles per hour. If the control energy be steadily applied, the limiting speed is 25 miles per hour, and this is also the limit when no control energy is present, but in the latter case, the cab signal is R, and not Y.

Upon the vehicle exceeding an existing speed limit, relay ISR releases to thereby energize a suppressive braking indication light SBI through a circuit including contact finger 40 and back point of relay ISR, and contact finger 41 and back point of suppression relay SupR, whereby to apprise the engineer that a penalty will be incurred unless prompt action be taken.

Should the engineer fail to take prompt action, a slow release penalty relay PR, which is energized through contact finger 42 and front point of relay ISR, releases after a short time, such as, for example, two and one-half seconds, to thereby deenergize a brake applying valve EPV which is normally energized through contact finger 43 and front point of relay PR. Upon valve EPV becoming deenergized, an automatic emergency brake application is incurred which cannot be released until the vehicle is brought to a speed as low as 5 miles per hour, whereupon speed contact 34 closes to reenergize relay PR through an obvious circuit whereby to reenergize valve EPV.

Assume, however, that the engineer is alert and upon seeing the energized suppressive brake indication SBI, that he applies his brakes to produce a manual service brake application. Upon performing this act the suppression relay SupR is energized in the manner, for example, as disclosed in Patent No. 2,223,131, referred to above. This relay remains energized so long as the brakes are applied and if the braking is continued so as to constitute a full service brake application, this relay remains energized even though the brake valve handle should be returned to release position. Upon suppression relay SupR picking up, the suppression brake indication is removed and if the braking be effected promptly, and before relay PR has released, a stick holding circuit for relay PR is closed which includes contact finger 43[1] and front point of the suppression relay and contact 44 and front point of relay PR, to thus prevent the imposition of the penalty of an emergency brake application since the deenergization of the valve EPV is prevented.

In this system, upon a vehicle entering an occupied block, where no control energy is received, relay CRFP releases whereby to deenergize and cause to sound a whistle valve AWV which is normally energized (and silent) through contact finger 45 and front point of relay CRFP. This apprises the engineer that he is in a danger block and unless he takes prompt action he will incur the penalty of an emergency brake application, since the release of relay CRFP deenergizes penalty relay PR which normally receives its energy through contact finger 46 and front point of relay CRFP. If the engineer take no suitable action, he incurs the brake penalty and must reduce his speed to at least five miles per hour in order to release the brakes and proceed, as explained above.

Upon hearing the whistle which, it should be noted, is arranged to sound when deenergized, the engineer should depress his acknowledging contactor AckC which preferably is in the form of a push button, whereby to complete a pick-up circuit for an acknowledging stick relay AS which is energized through acknowledging contact 47 and back point. Upon the picking up of relay AS this relay sticks up independently of the acknowledging contact through a circuit including contact finger 48 and back point, and contact finger 49 and front point.

The picking up of relay AS completes an energizing circuit for the whistle valve which circuit is independent of contact finger 45 of relay CRFP, and includes contact finger 50 and front point of relay AS, whereby to silence the whistle valve and to notify the engineer that he can then release his acknowledging contactor.

The acknowledging contactor is protected against misuse by including an acknowledging contact 51 in the energizing circuit for the penalty relay PR whereby, if the acknowledging contactor is tied down, or held down, an undue time, or otherwise misused, the penalty of an automatic emergency brake application is incurred.

After acknowledgment, and the release of the acknowledging contactor, the penalty relay is energized through a circuit including acknowledging contact 51 and front point, contact finger 52 and front point of relay AS, and contact 42 and front point of relay ISR. Thus the vehicle can proceed but only at a speed not above 25 miles per hour, since if it exceeds this speed, relay ISR becomes deenergized and the braking penalty is incurred.

Upon train control energy being received, whether it be coded or steady, relay CRFP picks up to thereby deenergize stick relay AS, and thus place the system under the control of the various speed contacts, as described above.

The various speed limits set up as described above are accompanied by cab signal indications corresponding to the various speed limits. As shown in the drawings, when the control energy is coded at the 180 rate, relay 180RP is in attracted position, and the cab signal G is energized through a circuit including contact finger 53 and front point of relay 180RP.

Upon the code rate changing to 120, signal G/Y is energized through contact finger 53 and back point, and contact finger 54 and front point. Upon the code rate changing to 75, signal Y/G is energized through contact finger 53 and back point, contact finger 54 and back point, and contact finger 55 and front point. Upon the control energy being received in a steady form, signal Y is energized through contact finger 53 and back point, contact finger 54 and back point, contact finger 55 and back point, contact finger 56 and back point, of relay AS, and contact finger 57 and front point of relay CRFP. Upon the train entering an occupied block, where no control energy is received acknowledgment must be performed to prevent the braking penalty, and hence the acknowledging stick relay AS is picked up while relay CRFP releases, and the cab signal R is first energized through contact finger 58 and back point of relay CRFP, etc., and after the acknowledging stick relay is picked up, through a multiple branch including contact finger 59 and front point of relay AS.

In connection with the above system there is a dial D having graduations indicating speed of the vehicle in miles per hour, and a speed hand SH, which is controlled by the speed governor SG, and at all times indicates the speed of the vehicle. The various cab signal indication means G, etc., are arranged around this dial opposite the limiting speeds which the particular indications are associated with, whereby the engineer has before him a visual interpretation of the cab signal indication in terms of speed in miles per hour.

Also, arranged adjacent the dial, as shown in Fig. 2, is the acknowledging contactor AckC, in the form of a button and the suppressive brake indicating means SBI, which is constituted by a light. Thus, the engineer, in operating his engine, has the various parts of the system which he must operate positioned readily at hand, and in full view, and so there is no necessity for interpretating any signal with regard to the speed which it controls. For example, should the code rate be 120 per minute, the cab signal G/Y is in force, and the limiting speed which is 60 miles per hour, is clearly indicated to the engineer on the associated dial, while the actual speed of the vehicle, as indicated by the pointer is constantly before him. Thus, the operation of the vehicle with the system of the type described above, is greatly facilitated by the arrangement of the parts as described just above.

Also, included in this system, is a means for recording the speed of the vehicle, and this is constituted by a marking member 65 which marks the speed of the vehicle in miles per hour on a tape 66 which is traveled at a uniform rate of speed by a clock work 67 connected to turn the spool or drum 68 to thus make a speed-time curve 69 on the tape.

An acknowledging recording relay ARR is provided which is energized upon each acknowledging act through a circuit including acknowledging contact 70 and back point. Upon each acknowledging act, relay ARR is energized to attract its armature 71 and cause a marking member 72 to make a mark on tape 66 to indicate the then speed of the vehicle, these acknowledging marks being indicated at 73. Thus, after a locomotive run, this record tape will show the vehicle speed throughout the run, and the speeds at which the vehicle entered occupied blocks, and thus furnish very valuable information for guidance in future operation of the locomotive.

In Fig. 2 is shown the receiving casing for the train control system described above, and this casing, which is essentially a unitary compact housing, has the speed and acknowledging recorder positioned in a portion at the top, and is identified by the word "recorder." Below the recorder is a section carrying the dial D with the cab signals arranged around the dial, and opposite the limiting speeds for each signal indication. Below the dial portion of the casing is a portion which receives the speed governor, the relays, etc., and which is equipped at the bottom with an inlet portion 74, receiving the governor drive. At the right of this lower portion of the casing is a portion identified as "speed control contacts," in which the various speed controlled contacts, described above, can be conveniently housed. The various wires involved in the system can be led into the unitary housing in the form of a conduit 75.

Thus, as viewed in Fig. 2, a compact housing is provided for receiving all of the various parts of the above described train control system with the speed governor controlling not only the speed contacts which set up speed limits but also controlling a speed indicating hand SH. This hand cooperates with a dial graduated in miles per hour, and has adjacent the dial the cab indications, positioned to give visual knowledge at all times of the significance of the various cab signals. This same governor also controls the speed recording device. There is assurance with the acknowledging contactor and the suppressive brake indication means, also mounted on the casing adjacent the speed dial, that the engineer will retain all of the various indication means of the system constantly in view and thus there is a greatly added assurance that more than usual vigilance will be exercised by the engineer in his operation of the locomotive.

Figure 3:
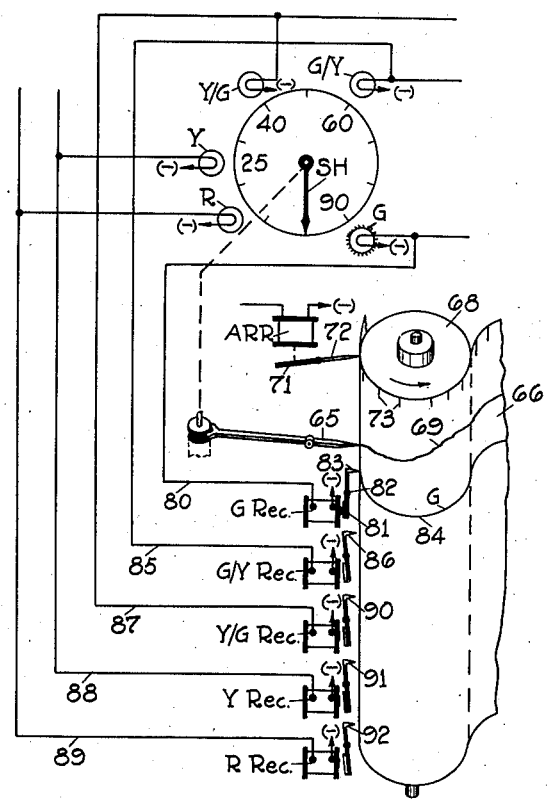
Fig. 3 is a fragmentary view of a slightly modified form of the invention.

In Fig. 3 is shown a slightly modified form of the invention wherein means is provided for making a record of the particular signal aspect under which the engine is proceeding throughout its entire run. The record tape 66 is shown together with its speed time curve 69 and its acknowledging records 73.

For recording the signal aspect under which the engine is running, each signal light such as G has connected in multiple with it a recorder operator, as G Rec, as by wire 80. This green recorder G Rec can be any usual tractive type of relay having an armature 81 pivoted at 82 and carrying a stylus or marking device 83 which is normally biased by gravity out of contact with the record tape 66 but which is pressed in contact therewith upon its actuating magnet being energized. The system is represented as operating under proceed conditions wherein signal lamp G is energized and the green recorder G Rec is energized. In these circumstances the stylus 83 is pressed against the record tape 66 and is producing the horizontal line 84 which records the fact that the engine is running under a green cab signal.

In a similar manner, signal lamp G/Y has connected in multiple with it a recorder operator G/Y Rec, energized through a circuit including wire 85 to operate its stylus 86.

In like manner, signal lamps Y/G, Y and R have connected in multiple therewith by the wires 87, 88 and 89 the recorder operators Y/G Rec, Y Rec and R Rec. These three recorder operators are, respectively, arranged to operate the three markers 90, 91 and 92.

Thus it appears that a record tape is produced in accordance with this invention, during the run of a locomotive which bears a time speed curve, a record of each operation of the acknowledging contactor, and a record throughout the run of just what signal aspects were in force and for what duration during the run.

As referred to above, if it be desired to equip a locomotive having a speed controlled system of train control of the type disclosed above, with a control system such as is generally known as the "loco-valve pilot" system, it is a very simple matter to so equip the locomotive. All that is necessary is to supply a second indication hand on the dial D, and control it by a valve pilot so as to indicate on the dial in terms of miles per hour the position of steam valve cut-off which is most economical at the various locomotive speeds. It is further necessary merely to record the indication of this valve cut-off position on the existing tape 66 which is already present in the system for the purpose of recording the speed, time, curve 69.

Thus, a system is provided which assures greater facility in operation of a locomotive, and greater assurance in safety in operation, and lends itself very readily and economically to expansion to include other control means such as that generally known as the "loco-valve pilot" control system.

The above rather specific description of the present invention has been given solely by way of illustration, and is not intended, in any manner whatsoever, in a limiting sense. It is to be understood that various modifications, adaptations and alterations may be applied to meet the requirements of practice without in any manner departing from the spirit or scope of the invention except as limited by the appended claims.

What I claim is:

1. In a train control system, vehicle carried means for receiving and responding to train control energy conditions on the trackway of characteristics differing in accordance with different traffic conditions ahead, means on the vehicle for establishing the same speed limit in response to each of two of said different energy conditions, a plural aspect cab signal, and control means for the signal distinctively responsive to said energy conditions to cause the signal to display a different aspect for each of said different energy conditions.

2. In a train control system, vehicle carried means for receiving and responding to train control energy conditions on the trackway of characteristics differing in accordance with different traffic conditions ahead, means on the vehicle for establishing the same speed limit in response to each of two of said different energy conditions, a plural aspect cab signal, control means for the signal distinctively responsive to said energy conditions to cause the signal to display a different aspect for each of said different energy conditions, a normally inoperative penalty device, and means for making the device operative upon the vehicle exceeding an established speed limit.

3. In a train control system, vehicle carried means for receiving and responding to train control energy conditions on the trackway of characteristics differing in accordance with traffic conditions ahead, means on the vehicle for establishing the same speed limit in response to each of two of said different conditions, a plural aspect cab signal, control means for the signal distinctively responsive to said conditions to cause the signal to display a different aspect for each of said different conditions, a normally inoperative penalty device, means for making the device operative upon the vehicle exceeding an established speed limit, means for making the penalty device operative upon the display of one of said signal aspects, manually operative acknowledging means, and circuit means effective upon the operation of the acknowledging means to prevent the penalty device from becoming operative in response to said display of said one of said signal aspects.

4. In a train control system, in combination with means for placing control energy on the wayside coded differently in accordance with traffic conditions ahead, vehicle carried means for receiving and responding distinctively to said energies, a centrifuge, contacts controlled by the centrifuge and cooperating with the vehicle means to establish different speed limits in response to the differently coded energies received, a normally inactive penalty means made active upon an established speed limit being exceeded, a plural aspect cab signal, signal means for displaying different signal aspects of different restrictivenesses in response to the differently coded energies received, a dial bearing speed graduations, and a speed indicating pointer operatively connected to the centrifuge and movable over the dial to indicate vehicle speed, the various signal aspects being positioned adjacent the dial and opposite the graduation denoting the limit of speed permitted under its corresponding signal aspect.

5. In a train control system, in combination with means for placing control energy on the wayside coded differently in accordance with traffic conditions ahead, vehicle carried means for receiving and distinctively responding to said energy, a speed responsive device, contacts controlled by the device and co-operating with the vehicle carried means to establish different speed limits in response to the differently coded energies received, a plural aspect cab signal, means for displaying different signal aspects of different restrictivenesses in response to the differently coded energies received, a dial bearing speed graduations, a speed indicating pointer operatively connected to the speed responsive device and movable over the dial to indicate vehicle speed, the various signal aspects being positioned adjacent the dial and opposite the graduation denoting the limit of speed permitted under its corresponding signal aspect, a normally inoperative penalty device, means making the device operative upon an established speed limit being exceeded unless manually prevented, suppression means operable to prevent operation of said device, and a warning signal displayed upon exceeding an established speed limit and positioned adjacent said dial.

6. In a train control system, in combination with means for producing different control energy conditions on the wayside in accordance with traffic conditions ahead, vehicle carried means for distinctively responding to said energy conditions, a speed responsive device, contacts controlled by the device and co-operating with the vehicle carried means for establishing different speed limits in response to the different energy conditions, a plural aspect cab signal, means for displaying different signal aspects of different restrictivenesses in response to the different energy conditions, a dial bearing speed graduations, a speed indicating pointer operatively connected to the speed responsive device and movable over the dial to indicate vehicle speed, the various signal aspects being positioned adjacent the dial and opposite the graduation denoting the limit of speed permitted under its corresponding signal aspect, a normally inoperative penalty device, means for making the device effective upon the display of the most restrictive of the signal aspects unless acknowledged, manually operative acknowledging means operable to acknowledge said most restrictive signal aspect, means controlled by said speed device to record the vehicle speed, and means to mark on the speed record each operation of the acknowledging means.

7. In a train control system, in combination with means for producing different control energy conditions on the wayside in accordance with traffic conditions ahead, vehicle carried means for receiving and responding distinctively to said energy conditions, a speed responsive device, contacts controlled by the device and cooperating with said vehicle carried means for establishing different speed limits in response to the different energy conditions, a plural aspect cab signal, means for displaying different signal aspects of different restrictivenesses in response to the different energy conditions, a dial bearing speed graduations, a speed indicating pointer operatively connected to the speed device and movable over the dial to indicate vehicle speed, the various signal aspects being positioned adjacent the dial and opposite the graduation denoting the limit of speed permitted under its corresponding signal aspect, a normally inoperative penalty device, means for making the device operative upon an existing speed limit being exceeded unless it be manually prevented, manually operable suppression means operable to prevent said device from becoming operative, a warning signal displayed upon exceeding an existing speed limit and positioned adjacent said dial, means for making the penalty device effective upon the display of one of the signal aspects unless acknowledged, manually operable acknowledging means operable to acknowledge said one signal aspect, means controlled by said speed device to record the vehicle speed, and means to mark on the speed record each operation of the acknowledging means.

8. In a train control system, in combination with means for placing control energy on the wayside coded differently in accordance with traffic conditions ahead, vehicle carried means for receiving and distinctively responding to said energy, a plural aspect cab signal, circuit means connecting the vehicle carried means to the signal for controlling the signal so as to display different signal aspects of different restrictiveness in response to the differently coded energies received, a record tape, means for moving the tape at a substantially uniform rate, a signal recording means for each signal aspect and each operative for marking distinctively on the tape when active, and means operatively connecting the said signal recording means to the cab signal whereby each recording means is rendered active in accordance with the distinctive energization of the signal.

9. In a train control system, in combination with means for producing different control energy conditions on the wayside in accordance with traffic conditions ahead, vehicle carried means for distinctively responding to said conditions, a centrifuge, contacts controlled by the centrifuge and co-operating with the vehicle carried means for establishing different speed limits in response to the said different conditions, a plural aspect cab signal, means controlling the signal for displaying a different signal aspect of different restrictivenesses in response to the said different conditions, a dial bearing speed graduations, a speed indicating pointer operatively connected to the centrifuge and movable over the dial to indicate vehicle speed, the various signal aspects being positioned adjacent the dial and opposite the graduation denoting the limit of speed permitted under its corresponding signal aspect, a normally inoperative penalty device, means for making the devive effective upon the display of the most restrictive of the signal aspects unless acknowledged, manually operative acknowledging means operable to acknowledge said most restrictive signal aspect, means controlled by said centrifuge to record the vehicle speed, means to mark on the speed record each operation of the acknowledging means, a signal recorder for each aspect of the signal, and effective when energized to mark on the speed record, and circuit means for selectively energizing the signal recorders to agree at all times with the energization of the cab signal.

PERCY W. SMITH.